(12) United States Patent
Hiruma

(10) Patent No.: US 9,868,216 B2
(45) Date of Patent: Jan. 16, 2018

(54) ROBOT

(71) Applicant: JANOME SEWING MACHINE CO., LTD., Hachioji-shi, Tokyo (JP)

(72) Inventor: Kenichiro Hiruma, Tachikawa (JP)

(73) Assignee: JANOME SEWING MACHINE CO., LTD., Tokyo (JP)

( * ) Notice: Subject to any disclaimer, the term of this patent is extended or adjusted under 35 U.S.C. 154(b) by 19 days.

(21) Appl. No.: 14/857,166

(22) Filed: Sep. 17, 2015

(65) Prior Publication Data

US 2016/0271802 A1 Sep. 22, 2016

(30) Foreign Application Priority Data

Mar. 18, 2015 (JP) .................................. 2015-054559

(51) Int. Cl.
*B25J 9/16* (2006.01)
(52) U.S. Cl.
CPC ............ *B25J 9/1697* (2013.01); *Y10S 901/47* (2013.01)
(58) Field of Classification Search
CPC .. G05B 19/402; G05B 19/408; G05B 19/409; G05B 19/4093; G05B 19/4097; G05B 19/4155; G05B 19/41; G05B 19/414; G05B 2219/40518; B25J 9/1661
See application file for complete search history.

(56) References Cited

U.S. PATENT DOCUMENTS

| | | | | |
|---|---|---|---|---|
| 6,662,082 B2* | 12/2003 | Hiruma | .................. | B25J 9/1661 318/568.1 |
| 7,116,993 B2* | 10/2006 | Farchmin | ............... | G05B 19/00 455/457 |
| 7,571,027 B2* | 8/2009 | Freeman | ................ | B25J 9/1607 318/568.11 |
| 7,804,194 B2* | 9/2010 | Zilberberg | .............. | H02J 9/065 307/66 |
| 7,983,476 B2* | 7/2011 | Tate | ....................... | G06T 7/0042 382/154 |
| 8,024,068 B2* | 9/2011 | Gray | ...................... | B25J 9/1602 382/153 |

(Continued)

FOREIGN PATENT DOCUMENTS

DE 112011101730 T5 6/2013
JP 2007-193846 A 8/2007

OTHER PUBLICATIONS

German Office Action dated Aug. 31, 2016 corresponding to application No. 10 2015 217 618.5.

*Primary Examiner* — Timothy Waggoner
(74) *Attorney, Agent, or Firm* — Nath, Goldberg & Meyer; Jerald L. Meyer; Stanley N. Protigal

(57) ABSTRACT

A robot executes sequential works at each work point based on point-based work data. An external instrument attached to the robot executes a main work at each work point in the sequential works. A controller controls the external instrument based on control data including structural point blocks arranged in sequence and bundling the sequential works at each work point. An external instrument driver transforms data format exchanged between the external instrument and the controller. A driver generator generates driver data indicating the detail of transformation of the data format by the external instrument driver. The driver selector selects the driver data to be utilized by the external instrument driver in accordance with the external instrument.

18 Claims, 16 Drawing Sheets

(56) References Cited

U.S. PATENT DOCUMENTS

| | | | | |
|---|---|---|---|---|
| 8,060,251 B2* | 11/2011 | Gonzalez-Banos | B25J 9/161 318/568.11 |
| 8,332,071 B2* | 12/2012 | Zeltzer | G05B 19/401 700/250 |
| 8,568,545 B2* | 10/2013 | Lindgren | B29C 73/10 156/350 |
| 8,725,283 B2* | 5/2014 | Gray | G05B 19/4069 700/103 |
| 8,838,265 B2* | 9/2014 | Kimura | G05B 19/184 318/561 |
| 9,266,238 B2* | 2/2016 | Huettenhofer | B25J 9/162 |

\* cited by examiner

DRIVER DATA 423

| | |
|---|---|
| USER ID | suzuki_k |
| PROTECT MODE | protected |
| EXTERNAL INSTRUMENT TYPE ID | KS_UserCamera |
| EXTERNAL INSTRUMENT TYPE | CV−1000 |
| COMMUNICATION CONTENT | 001 ···<br>002 ···<br>003 ··· |
| EXTERNAL INSTRUMENT COMMAND | %S |
| DATA READ-OUT FORMAT | nn,$x_1x_1x_1x_1.x_1x_1,y_1y_1y_1,$<br>··· |

*FIG. 5*

| WORK CORRECTION # | 1 |
|---|---|
| WORK CORRECTION TYPE | CAMERA WORK CORRECTION |
| EXTERNAL INSTRUMENT TYPE | CV-1000 |
| CALIBRATION | |
| TRANSFORMATION COEFFICIENT | 12.58 |
| FIRST REFERENCE MARKING POSITION | X=100.00, Y=95.00 |
| SECOND REFERENCE MARKING POSITION | X=98.00, Y=92.00 |
| AMOUNT OF CORRECTION | X=aaa, Y=bbb |

| 71 | 72 | 73 | 74 | 75 | 76 | 77 |
|---|---|---|---|---|---|---|
| #1 | PTP DRIVER | X=100, Y=100, Z=20 | SPEED 40 | WORK AFTER MOVEMENT | 1 | NONE |
| #2 | DOT APPLI-CATION | X=100, Y=140, Z=30 | SPEED 40 | NONE | NONE | WORK CORRECTION 1 |
| #3 | PTP DRIVER | X=150, Y=100, Z=20 | SPEED 40 | WORK AFTER MOVEMENT | 1 | NONE |
| #4 | DOT APPLI-CATION | X=150, Y=140, Z=30 | SPEED 40 | NONE | NONE | WORK CORRECTION 1 |

EXTERNAL INSTRUMENT TYPE
A210/A110
PV-200
PV-500
CV-1000
CV-500
SS-1258-QA
JOCAM
DVU-1000

HELP

| POINT NO.4 | POINT TYPE OPTION | POINT CO-ORDINATE | POINT SPEED | WORK TYPE OPTION | WORK NUMBER | POINT CORRECTION | EXTERNAL INSTRUMENT TYPE |
|---|---|---|---|---|---|---|---|
| #1 | PTP DRIVER | X=100, Y=100, Z=20 | SPEED 40 | WORK AFTER MOVEMENT | 1 | NONE | CV-1000 |
| #2 | DOT APPLICATION | X=100, Y=140, Z=30 | SPEED 40 | NONE | NONE | WORK CORRECTION 1 | CV-1000 |
| #3 | PTP DRIVER | X=150, Y=100, Z=20 | SPEED 40 | WORK AFTER MOVEMENT | 1 | NONE | CV-1000 |
| #4 | DOT APPLICATION | X=150, Y=140, Z=30 | SPEED 40 | NONE | NONE | WORK CORRECTION 1 | CV-1000 |

(71, 72, 73, 74, 75, 76, 77, 78)

ROBOT

CROSS-REFERENCE TO RELATED APPLICATION

This application is based upon and claims the benefit of priority from Japan Patent Application No. 2015-054559, filed on Mar. 18, 2015, the entire contents of which are incorporated herein by reference.

FIELD OF THE INVENTION

The present invention relates to a robot that can perform communication between an external instrument and a controller.

BACKGROUND

There are known robots that perform various kinds of works, such as visual inspection, position correction, and visual appearance imaging, on a work-piece through various external instruments. According to such robots, when, for example, a position of a work-piece is to be corrected, the robots are provided with a camera to pick up an image, thereby detecting the position of the work-piece. Next, the position of the work-piece is corrected based on the detected position of the work-piece. An image processor is provided in the camera, and the image processor picks up an image based on an image-pickup command from a controller of the robot, and outputs the image-pickup result to the controller.

When such robots are compatible with various kinds of cameras, users and facility vendors can select, purchase, and attach a commercially available camera product in accordance with the application of the robots and the available budgets. In this case, the image processors in the cameras often utilize a different communication protocol from that of the robot.

The communication protocol of the image processor in the camera may vary depending on the camera manufacturer and the model number of camera although the manufacturer is consistent. Hence, it is not so difficult to prepare beforehand communication protocols at the robot compatible with major manufacturers and cameras, but is often difficult to prepare beforehand communication protocols compatible with all cameras.

What is different in accordance with a camera is only the communication protocol of the image processor, and the content of communication is not different. Hence, if a communication protocol in accordance with a camera can be prepared at the robot, the robot can communicate with the camera. Although the explanation was given of the camera as an example, the similar problem occurs when the external instrument is, for example, a sensor.

The present invention has been proposed to address the above technical problems of conventional technologies, and it is an objective of the present invention to provide a highly versatile robot that enables a user to newly generate a driver in accordance with an external instrument to be utilized, thereby making various kinds of external instruments available.

SUMMARY OF THE INVENTION

In order to accomplish the above objective, a robot according to an aspect of the present invention executes sequential works at each work point, and the robot includes:

an external instrument executing a main work at the each work point in the sequential works;

a controller controlling the external instrument based on control data including structural point blocks arranged in sequence, the structural point blocks bundling the sequential works at the each work point;

an external instrument driver transforming a format of data exchanged between the external instrument and the controller;

a driver generator generating driver data indicating a detail of the transformation of the data format by the external instrument driver; and a driver selector selecting the driver data utilized for the external instrument driver in accordance with the external instrument to be utilized.

The sequential works may include the actual work executed by the external instrument, a pre-work and a post-work before and after the main work, and positioning to a plurality of work points for the main work, and, the structural point block constructing the control data may store, in association with each other, data indicating a work in the sequential works and a detail of movement, and, the driver data.

The structural point block may contain point statements indicating all work points to be positioned during the sequential works, and details of the works before the movement to the point, during the movement, and after the movement, the point statements being arranged in sequence in the structural point block, and, the each point statement may store, in association with each other, data indicating a work in the sequential works and a detail of the movement, and, the driver data.

The robot may further include an external-instrument driver storage storing the driver data with an identifier to identify the stored driver data, in which in the control data, the driver data to be utilized may be specified by the identifier.

The driver data may contain an order of execution of the works to be executed by the external instrument, and, a work command that causes the external instrument to execute the work.

The driver data may contain a variable utilized when data transmitted from the external instrument is received by the controller.

The driver data may contain an external instrument type indicating a kind of the external instrument, and the robot may further include a transformation coefficient calculator calculating a transformation coefficient to transform a coordinate system employed by the external instrument indicated by the external instrument type into a coordinate system employed by the control data.

The control data may contain a position of the work point, and a point correction that is a condition to calculate an amount of correction in accordance with an amount of displacement from a disposing position of a work-piece subjected to the work, and the point correction may contain a coordinate of a reference marking given to the work-piece and becoming a reference when the work-piece is disposed at an appropriate disposing position, the external instrument type, and the transformation coefficient.

The robot may further include a user verifier verifying an account given to a user, in which the driver generator may generate the driver data in accordance with an input given by the user who has the account.

There may be plural kinds of the account, and an authority with a different level account by account may be given.

The external instrument may be a sensor or a camera.

BRIEF DESCRIPTION OF THE DRAWINGS

FIG. 5 is a diagram illustrating example driver data according to the embodiment;

FIG. 7 is a diagram illustrating an example point correction according to the embodiment;

FIG. 12 is a diagram illustrating an example point statement in the control data according to the embodiment;

FIG. 13 is a diagram illustrating an example display form by a display according to the embodiment;

FIG. 14 is a diagram illustrating a first modified example of the control data according to the embodiment;

DETAILED DESCRIPTION OF THE EMBODIMENTS

Embodiments of a robot according to the present invention will be explained in detail below with reference to the figures. In the following embodiments, a duplicated explanation with reference to the figures will be omitted.

First Embodiment (1) Entire Structure

Figure 1:
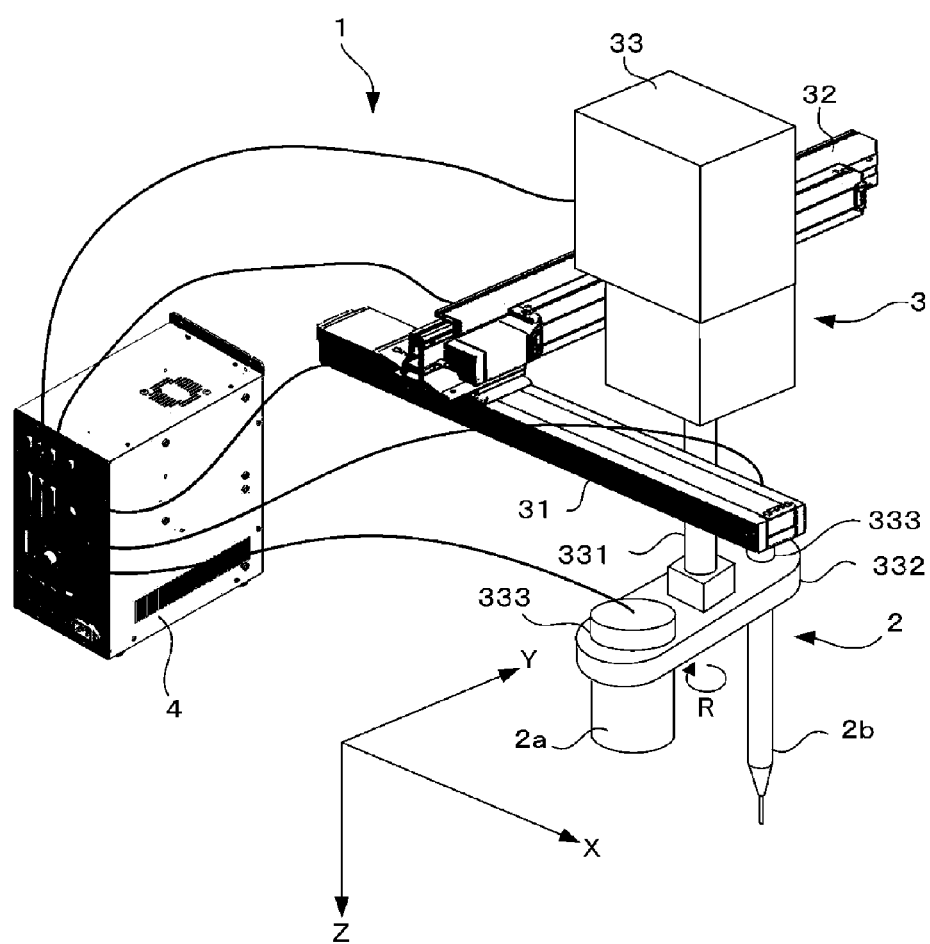
FIG. 1 is a perspective view illustrating a structure of a robot according to an embodiment.

FIG. 1 is a perspective view illustrating a structure of a robot according to this embodiment. As illustrated in FIG. 1, a robot 1 includes external instruments 2, a moving unit 3 that moves the external instruments 2, and a controller 4 that controls the external instruments 2 and the moving unit 3. The robot 1 controls the moving unit 3 and the external instruments 2 to cause the external instrument 2 to execute a work at a desired position.

The external instrument 2 is an instrument that performs a predetermined operation in accordance with external control signals. The external instrument 2 not only simply performs various operations in accordance with the external control signals, but also controls the own function of the external instrument 2 in accordance with external signals, and outputs the control result to the exterior. That is, the external instrument 2 executes a predetermined work in accordance with signals from the controller 4, and outputs the control result to the controller 4. An example external instrument 2 to be utilized is a camera or a sensor. This external instrument 2 is attached to the moving unit 3. The external instrument 2 is fastened to an attachment part of the moving unit 3. The fastening is carried out by, for example, bolts and screws, and the external instrument 2 is detachable.

The moving unit 3 moves the external instrument 2 in an X-axis direction, a Y-axis direction, and a Z-axis direction. Next, the moving unit 3 positions the external instrument 2 at a specified point. The X-axis direction is an axial direction in parallel with a horizontal plane. The Y-axis direction is another axial direction in parallel with the horizontal plane but is orthogonal to the X-axis direction. The Z-axis direction is a height direction. This moving unit 3 includes an X linear slider 31 that moves the external instrument 2 in the X-axis direction, a Y linear slider 32 that moves the external instrument 2 in the Y-axis direction, and a Z-linear slider 33 that moves the external instrument 2 in the Z-axis direction.

The X linear slider 31 has the Y linear slider 32 provided slidably on a rail that extends in the X-axis direction, and has the Y linear slider 32 fastened with an endless belt that runs in the X-axis direction which is orthogonal to the Y linear slider 32. The endless belt is run by an X-axis motor to move the Y linear slider 32 along the X-axis direction.

The Y linear slider 32 has the Z linear slider 33 provided slidably on a rail that extends in the Y-axis direction, and has the Z linear slider 33 fastened with an endless belt that runs in the Y-axis direction. The endless belt is run by a Y-axis motor to move the Z linear slider 33 along the Y-axis direction. Example transmission unit for the X and Y linear sliders 31, 32 are, in addition to endless belts, various actuators including a cylinder and a lead screw.

The Z linear slider 33 includes an arm 331 with an axis that is in parallel with the Z-axis direction, and an external-instrument attaching plate 332 is provided at the leading end of this arm 331 (serving as R-axis). The arm 331 is moved in the Z-axis direction by a Z-axis motor. The external-instrument attaching plate 332 moves in the Z-axis direction through this Z linear slider 33. In addition, the Z linear slider 33 includes an R-axis rotation unit that rotates the arm 331 around the center thereof in an R direction. The R-axis rotation unit causes the external-instrument attaching plate 332 of the arm 331 to rotate around the center of the arm 331. The external-instrument attaching plate 332 is provided with plural installation mounts 333 to attach the respective external instruments 2. The robot 1 can attach various kinds of external instruments 2 to these installation mounts 333, and in the case of FIG. 1, a camera 2a and an applicator 2b are installed.

(2) Structure of Controller

Figure 2:
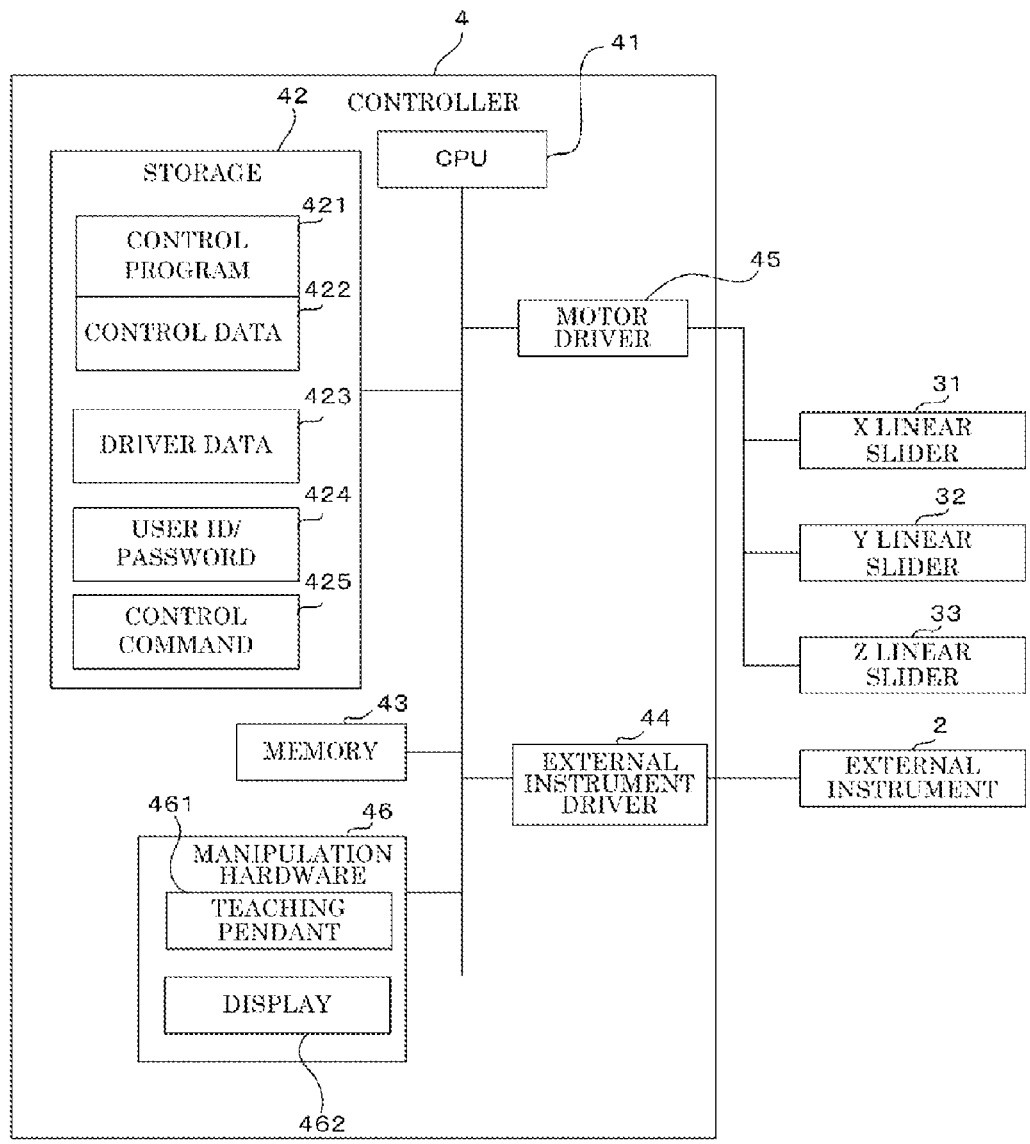
FIG. 2 is a block diagram illustrating a structure of a controller according to the embodiment.

The controller 4 is a so-called computer. FIG. 2 is a block diagram illustrating a structure of the controller 4. As illustrated in FIG. 2, the controller 4 includes a CPU 41 which executes an arithmetic processing and outputs command signals in accordance with control data 422 that is an element of a control program 421, a storage 42 that stores the control program 421, the control data 422, driver data 433, a user ID/password 424 given to a user who generates the driver data 423, and a control command 425, a memory 43 in which the control program 421 is extracted and which temporarily stores the arithmetic processing result by the CPU 41, an external instrument driver 44 which transforms the command signals output by the CPU 41 into a format recognizable for the external instrument 2, and which also transforms the format employed by data output by the external instrument 2 into a format available for the arithmetic processing by the CPU 41, and, a motor driver 45 that supplies power pulses to each motor in accordance with the command signals output by the CPU 41. The controller 4 further includes peripheral units that are manipulation hardware 46 which include, for example, a mouse, a keyboard, a teaching pendant 461, and a display 352 like a liquid crystal display.

Figure 3:
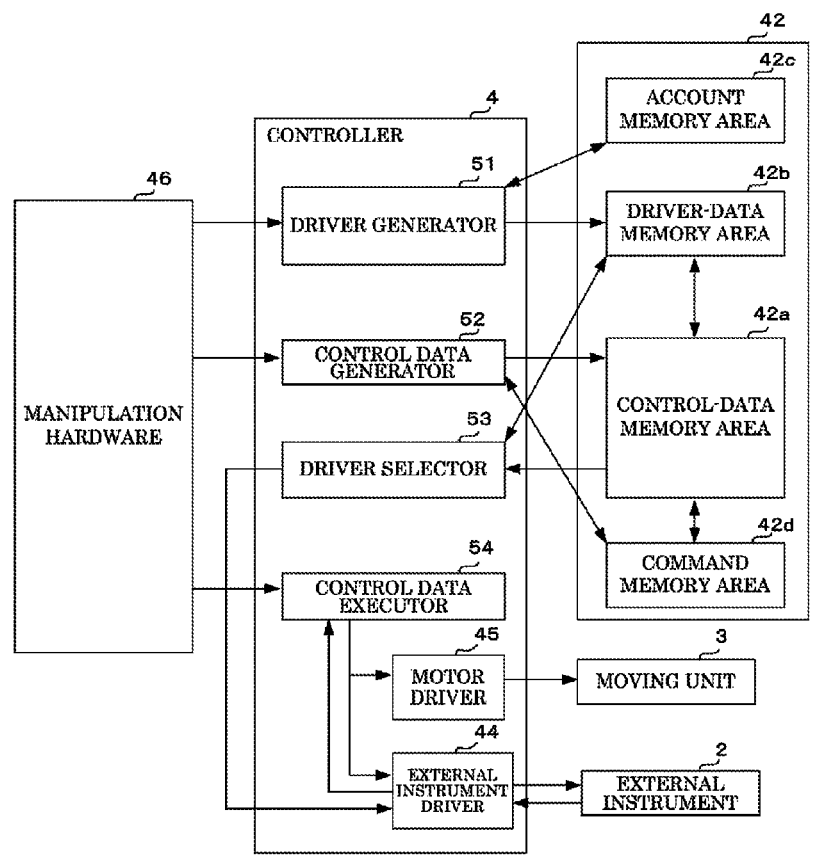
FIG. 3 is a functional block diagram illustrating a function of the controller according to the embodiment.

FIG. 3 is a functional block diagram of the controller 4. This controller 4 runs the control program 421 stored in the storage 42, thereby functioning as, in the controller 4, a driver generator 51, a control data generator 52, a driver selector 53, and a control data executor 54.

(Driver Generator)

Figure 4:
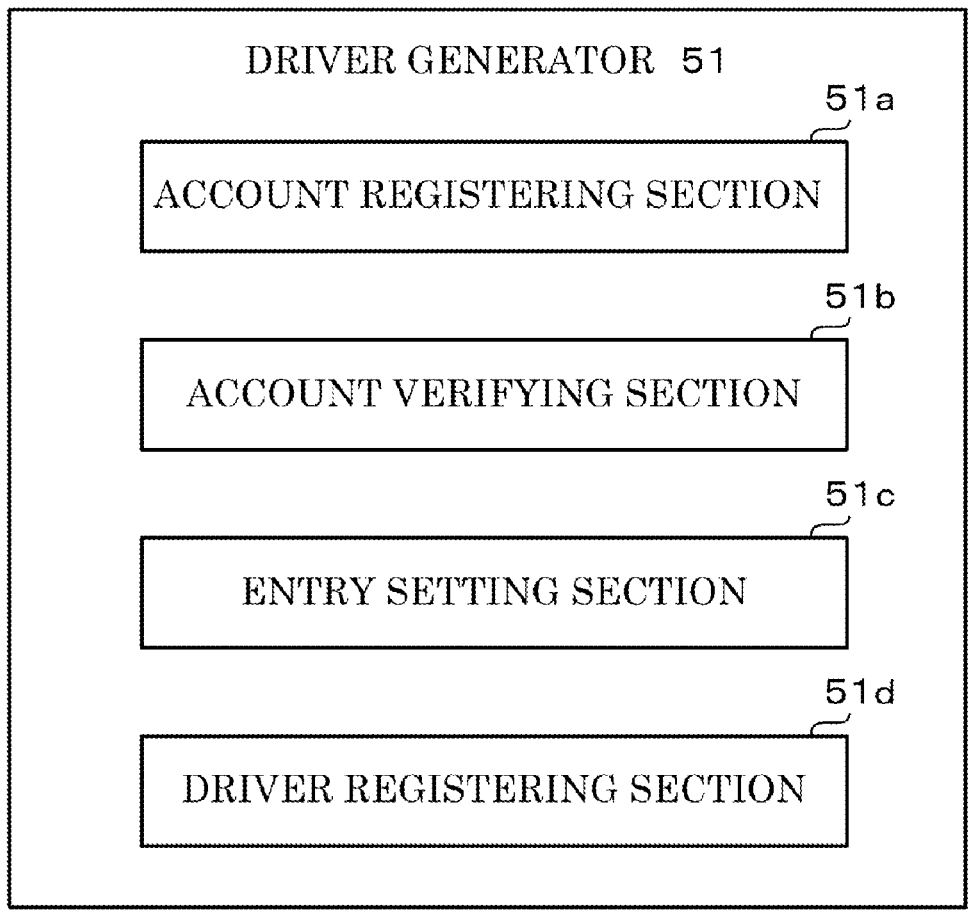
FIG. 4 is a block diagram illustrating a structure of a driver generator according to the embodiment.

The driver generator 51 generates, in accordance with an input through the manipulation hardware 46, the driver data 423 to be utilized by the external instrument driver 44. The driver data 423 generated by the driver generator 51 is stored in a driver-data memory area 42b in the storage 42. As illustrated in FIG. 4, the driver generator 51 includes an account registering section 51a that gives an authority for the user to generate the driver data 423, an account verifying section 51b that verifies the user account at the time of generating the driver data 423, an item setting section 51c that sets each item in the driver data 423, and a driver registering section 51d that registers the generated driver data 423 in the driver-data memory area 42b in the storage 42.

The account registering section 51a gives an authority for the user who attempts to generate the driver data 423 to enable a generation of the driver data 423. As for the authority, a "user ID" and a "password" in accordance with the attribute of the user in an account memory area 42c are given to the user who wants to generate the driver data 423. The attribute of the user can be classified into, for example, the manufacturer of the robot 1, a vender who purchases the robot 1 from the robot manufacturer, and sets up the robot 1, and, a user who purchases the robot 1 from the vendor and actually uses the purchased robot 1.

The account verifying section 51b checks whether or not the user has the authority to generate the driver data 423. The account verifying section 51b receives input account ID and password from the user. Next, the account verifying section 51b determines whether or not the combination of the input account ID and password matches the combination of the "user ID" and "password" stored in the account memory area 42c. When the input combination matches the registered combination of the "user ID" and the "password", the account verifying section 51b permits the user who has input the combination of the account ID and password to generate the driver data 423.

The item setting section 51c receives an input from the authenticated user, and sets each item of the new driver data 423. FIG. 5 illustrates entries to be set as the driver data 423. As illustrated in FIG. 5, the driver data 423 includes the respective entries that are "user ID", "protect mode", "external instrument type ID", "external instrument type", "communication content", "external instrument command", and "data read-out format".

The "user ID" is the account ID given to the user who has generated the driver data 423. The "protect mode" indicates an availability control of the generated driver data 423 for other accounts. For example, the "protect mode" can be set as follows.

(a) Not constraint: users of other accounts can freely refer, change or utilize the data;

(b) Public: users of other accounts can refer or utilize the data;

(c) Protected: users of other accounts can only utilize the data; and (d) Private: users of other accounts are prohibited to refer, change or utilize the data.

The "external instrument type ID" is a number that indicates, for example, the type number of the external instrument 2. The "external instrument type" is a name added to each driver data 423. The "external instrument type" is utilized as an identifier that indicates the kinds of the driver data 423. The "communication content" indicates the content of communication output by the controller 4 to cause the external instrument 2 to execute a work. Example contents of communication are a timing of releasing a memory, a port # (number) utilized for an output, a delay time, and a port # for outputting data. The "communication content" specifies the order of execution of a work by the external instrument 2, and a necessary time thereof. For example, as the content of communication, the external instrument 2 is instructed to release a memory, execute an external command that is "% S", stand by for 300 seconds, and obtain data that is an execution result of the external command which is "% S".

The "external instrument command" is a command to cause the external instrument 2 to execute various works. The "external instrument command" is in a format readable by the external instrument 2. When, for example, the external instrument 2 is a camera 2a and an image-pickup command is "% S", the "external instrument command" that is "% S" will be set. When the external instrument driver 44 refers to this driver data 423, the command "% S" is output to the camera 2a in accordance with a received command to the camera 2a based on a point statement 7.

The "data read-out format" indicates the format employed by data output by the camera 2a. For example, a camera capturing data format that is "nn, $x_1x_1x_1x_1$. $x_1x_1$, $y_1y_1y_1y_1$. $y_1y_1$, $r_1r_1r_1$. $r_1r_1$, $x_2x_2x_2x_2$. $x_2x_2$ . . . " is set. nn is a number of sets to identify the data, and $x_1$, $x_2$ are X coordinates in obtained data. $y_1$ is a Y coordinate in the obtained data, and $r_1$ is a rotation [degree] of data in the obtained data. The external instrument driver 44 has a function #numCameraData to extract the number of sets from the obtained data, a function #CameraDataX [ ] to extract the X coordinate, a function #CameraDataY [ ] to extract the Y coordinate, and a function #CameraDataT [ ] to extract the rotation [degree]. When the external instrument driver 44 specifies this driver data 423, with reference to the "camera capturing data format", the number of sets, the X coordinate, the Y coordinate, and the rotation [degree] are extracted from the obtained data. Next, those pieces of information are output in accordance with the data format employed by the point statement 7.

The driver registering section 51d stores, in the driver-data memory area 42b, the driver data 423 that has the respective entries set by the item setting section 51c. The driver data 423 is stored in association with an identifier to identify this data. The identifier for the driver data 423 to be stored is the "external instrument type" set by the item setting section 51c.

(Control Data Generator)

Figure 6:
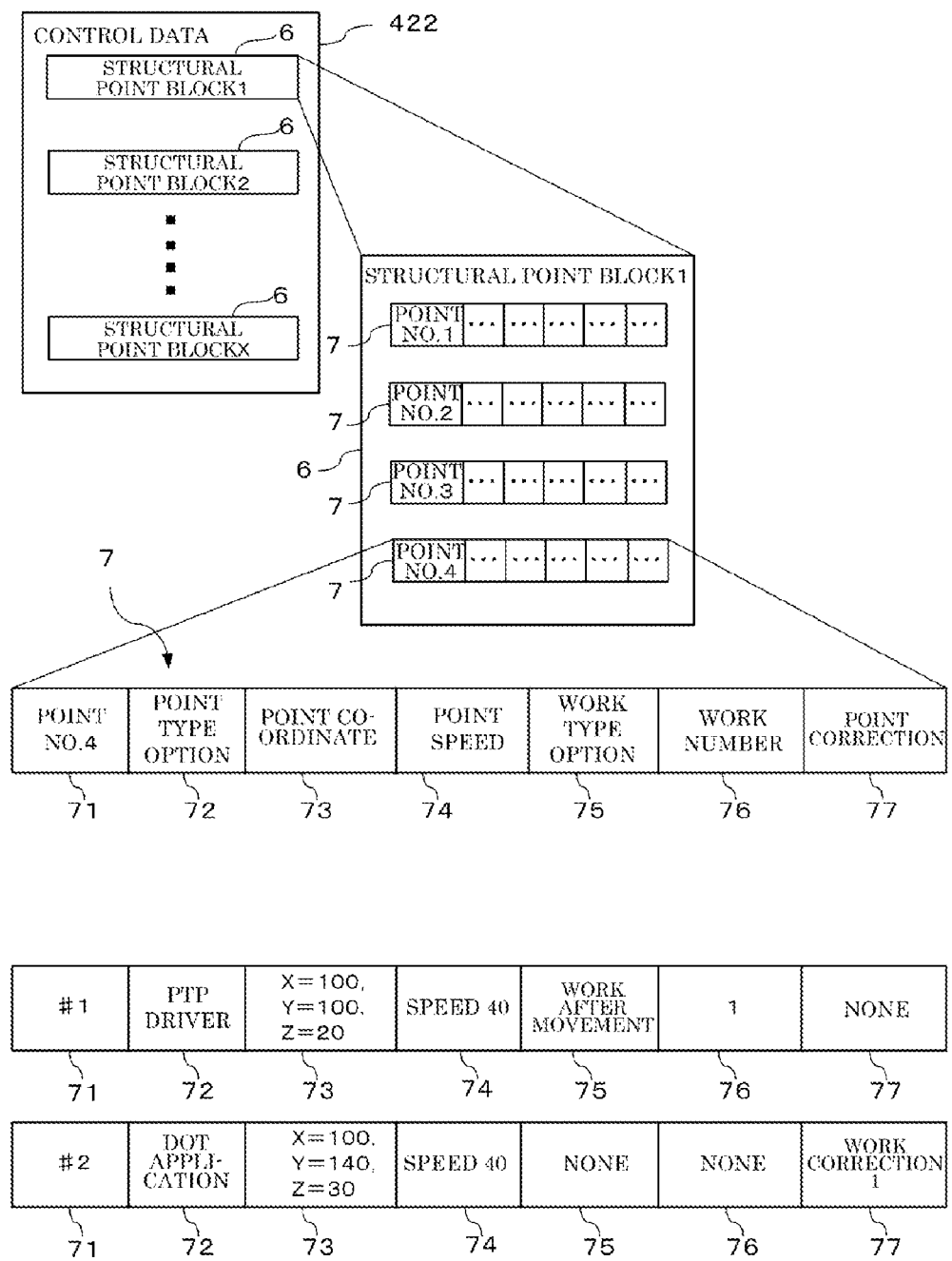
FIG. 6 is a block diagram illustrating a structure of control data according to the embodiment.

The control data generator 52 generates the control data 422 in accordance with an input through the manipulation hardware 46. The control data 422 generated by the control data generator 52 is stored in a control-data memory area 42a of the storage 42. FIG. 6 is an exemplary diagram illustrating an entire structure of the control data 422. The control data 422 records sequential works at each process point. This control data 422 has plural structural point blocks 6 arranged in sequence. The structural point block 6 records a bundle of the sequential works to a process point.

The sequential works are recorded with point-based sentence structures. That is, the structural point block 6 includes whole point statements 7 each representing the sequential works to a process point. Each point statement 7 is information prepared for each point that needs a positioning in order to complete the main work at the process point. The main work uses actions that the external instrument 2 originally has, for example, the main work is tightening a screw with a screw driver, applying paint to the work-piece with an applicator 2b, and taking photo with a camera 2a. This point statement 7 includes, following to a point number 71, a point type option 72, a point coordinate 73, and a point speed 74 arranged in sequence. In addition, the point statement 7 also includes, following to the point number 71, a work type option 75, a work number 76, and a point correction 77 arranged in sequence.

The point number 71 clarifies a declaration that the point statement is in a point-based sentence structure, and a delimiter. The point number 71 divides each point statement 7. The point type option 72 indicates a combination of the kind of point and the movement method. The point type includes, for example, a routing point, the start point of the main work, and the end point of the main work. The movement method is, for example, a movement for dot application, a movement for screw fastening, a PTP movement, a linear interpolation movement, or a circular-arc interpolation with a specified supplemental point. An example movement for dot application is a movement method that is a combination of a PTP drive and a dot application work after the PTP drive. In addition, with respect to the record of the point type option 72 indicating the routing point, recording of plural point coordinates 73 indicating the respective routing points is permitted.

The work number 76 is an identifier that indicates an order set which describes the work details of the external tool 2. The order set is described in a robot language, such as SLIM (Standard Language for Industrial Manipulators), and is stored beforehand in a command memory area 42d of the storage 42. The work type option 75 indicates a time period at which the work indicated by the work number 76 is to be executed. This work type option 75 indicates a work before movement, a work during the movement, a work at the start point, a work at the end point, or the main work.

The point correction 77 is an identifier that indicates a condition utilized to calculate an amount of correction in the point coordinate 73, and the amount of correction calculated based on that condition. The condition and the amount of correction in the point correction 77 are stored in a command memory area 42d. The control data executor 54 causes the external instrument 2 to execute the work at a coordinate obtained by reflecting, on the point coordinate 73 of the point statement 7 in the control data 422, the amount of correction calculated based on the condition described in the point correction 77. That is, when a work-piece W to be processed is disposed at a predetermined disposing position, and the external instrument 2 executes a work on the work-piece W, the point coordinate 73 specified by the point statement 7 is based on a presumption that the work-piece W is disposed at an appropriate disposing position. Hence, when the work-piece W is displaced from the predetermined disposing position, the main work will be executed on the displaced work-piece W at a process point that is the point coordinate 73 based on the presumption that the work-piece W is disposed at an appropriate disposing position. Accordingly, a result desired by the user cannot be obtained.

Therefore, when the work-piece W is displaced from the intended disposing position, it is necessary to calculate the amount of displacement.

FIG. 7 illustrates an identifier that indicates the condition utilized to calculate the amount of correction. FIG. 7 also illustrates "work correction (number)" stored as the point correction 77. As illustrated in FIG. 7, the point correction contains "work correction #", "work correction type", "external instrument type", "transformation coefficient", "first reference marking position", and "second reference marking position". In addition, this point correction 77 is stored as "work correction (number)" with the identifier that is the work correction #.

The "work correction #" is an identification number given to the condition utilized to calculate the amount of correction. The "work correction type" indicates a way of correcting the amount of correction, such as a camera work correction through the camera 2a, or a sensor work correction through sensors. The "external instrument type" indicates the ID of the external instrument 2 utilized for each work correction, and example IDs are a type number, a product serial number, and the external instrument type given to the generated driver to be explained later. The "transformation coefficient" is a transformation coefficient utilized when the coordinate system employed by the external instrument 2 is transformed into a coordinate system employed by the control data 422. This transformation coefficient registers "12.58" that is calculated through a calibration to be explained later.

Figure 8:
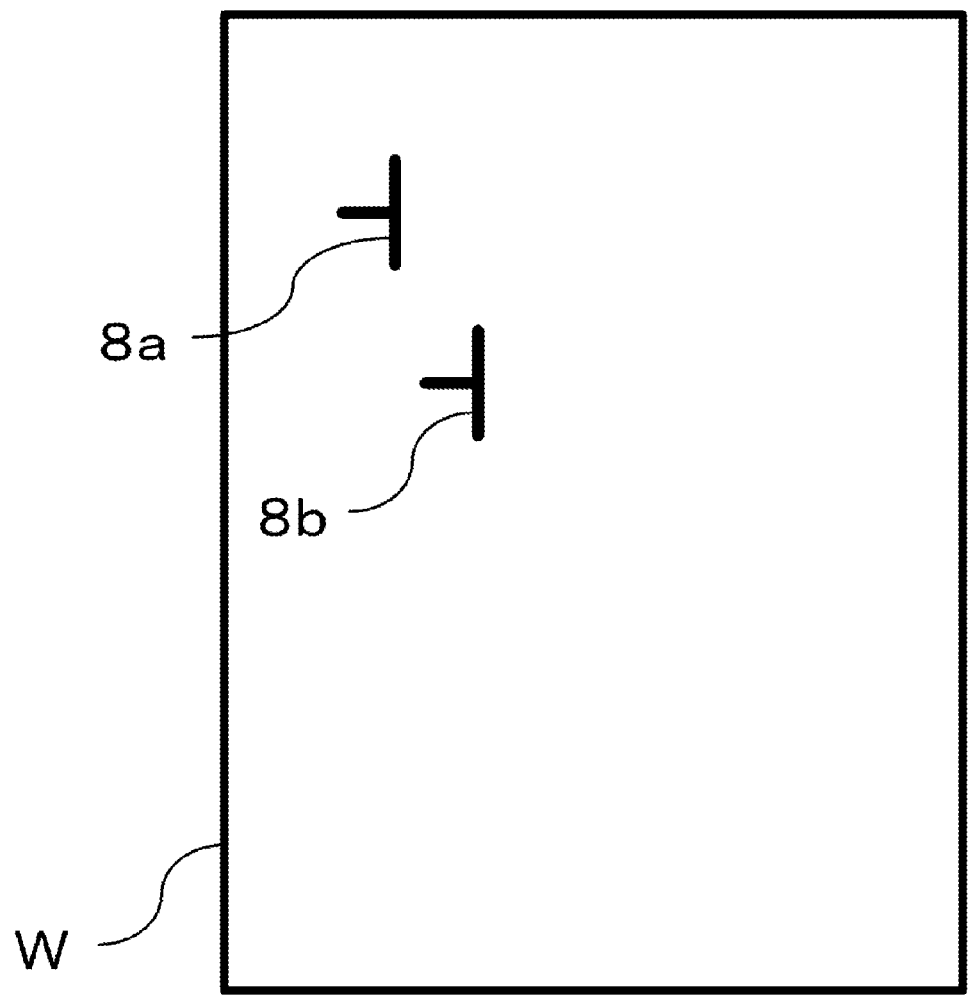
FIG. 8 is a plan view illustrating a structure of a workpiece according to the embodiment.

The "reference marking position" indicates the position of a reference marking that will be a reference to determine whether or not the disposed work-piece W is in an appropriate position and in an appropriate attitude. The reference marking position is specified by the coordinate system employed by the control data 422. For example, as illustrated in FIG. 8, two reference marking 8 are put on the surface of the work-piece W beforehand. In this case, two kinds of coordinates are registered as the reference marking positions. That is, the coordinates of a reference marking 8a when the work-piece W is disposed at an appropriate disposing position and in an appropriate attitude are registered as the coordinates of the first reference marking (i.e., X=100.00, Y=95.00), and the coordinates of a reference marking 8b when the work-piece W is disposed at an appropriate disposing position are registered as the coordinates of the second reference marking (i.e., X=98.00, Y=92.00).

(Driver Selector)

The driver selector 53 reads, in accordance with the external instrument type described in the point correction 77 of the control data 422, the driver data 423 compatible with the external instrument 2 from the driver-data memory area 42b of the storage 42, and reflects the read driver on the external instrument driver 44. That is, when the point correction 77 of the point statement 7 with the point number 2 in FIG. 6 is a work correction 1, the driver selector 53 reads, from the driver-data memory area 42b, the driver data 423 with the identifier "CV-1000" that is the external instrument type set in the work correction 1. Next, the driver data 423 is output to the external instrument driver 44, and the content of the external instrument driver 44 is rewritten based on the driver data 423.

(Control Data Executor)

The control data executor 54 outputs, in accordance with an input through the manipulation hardware 46, control commands to the moving unit 3 and the external instrument 2 based on the control data 422. The control data executor 54 sequentially executes each of the whole point statements 7 in the control data 422. That is, the control data executor 54 refers to the structural point blocks 6 one after another from the header point block. As for the reference to the structural point blocks 6, the control data executor 54 refers to the respective point statements 7 in the structural point block 6 from the header point statement. Next, when the control operated indicated by the point statement 6 is executed, and the execution of the control operation indicated by the whole point statements 7 completes, the process returns to the main routine. When the process returns to the main routine, the control data executor 54 continues to refer to the next structural point block 6.

In the control data executor 54, the control command output to the moving unit 3 based on the point statement 7 is output through the motor driver 45. In addition, the control command output to the external instrument 2 based on the point statement 7 is output to the external instrument 2 through the external instrument driver 44. The control command output based on the point statement 7 is transformed and output in the format employed by a command to cause the external instrument 2 to execute a work through the external instrument driver 44. In other words, the external instrument driver 44 outputs, in accordance with the readable format by the external instrument 2, the control detail described by the point statement 7. Conversely, when the external instrument 2 outputs a control result, the external instrument driver 44 transforms the data format employed by the control result in accordance with the format employed by the point statement 7.

[1-2. Action]

According to the robot 1 of this embodiment employing the above structure, the external instrument 2 is caused to execute a work through the following processes.

(1) Generating process of driver data 423 in accordance with external instrument 2;

(2) Point correction setting process of setting the condition to calculate the amount of correction utilized for the control data 422;

(3) Generating process of control data 422 that associates external instrument 2 to be controlled with driver data 423 compatible therewith; and (4) Control process for moving unit 3 and external instrument 2 based on control data 422.

To facilitate understanding for the present invention, the following explanation will be given of procedures that include a creation of the new driver data 423 for the camera 2a, a setting of the condition to calculate a corrected position using the camera 2a, a creation of the control data 422 with a position correction, and an applying work with the position correction when the camera 2a and the applicator 2b are installed as the external instruments 2.

(1) Driver Data Generating Process

Figure 9:
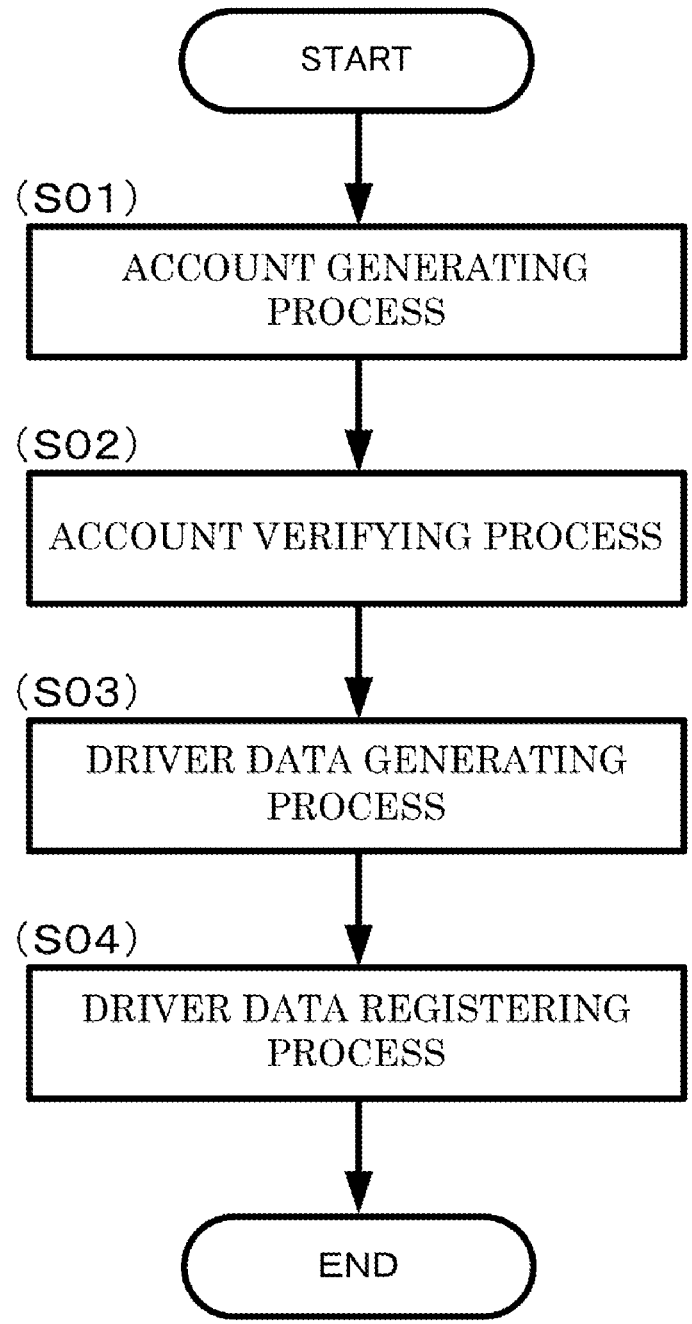
FIG. 9 is a flowchart illustrating a driver data generating process according to the embodiment.

In the driver data generating process, the driver data 423 compatible with the attached camera 2a as the external instrument 2 is generated. For example, it is presumed that the format employed by the camera 2a attached as the external instrument 2a is "KS_UserCamera", and the driver data 423 compatible with this camera 2a has not been stored in the driver-data memory area 42b yet. New driver data 423 compatible with the camera format "KS_UserCamera" is generated through processes of registering the account, verifying the account, generating the driver, and registering the driver. FIG. 9 is a flowchart illustrating a procedure of the generating process of the driver data 423.

In the account registering process, an account to generate the driver data 423 is generated. At the time of generating the driver, an authority to generate the external driver is given to the user who attempts to generate the external driver. As for the authority, the "user ID" and the "password" both in the account memory area 42c are given (step S01) to the user who wants an authority. For example, a user ID (account ID) "Suzuki_k" and a password "1234" are given to a user A.

In the account verifying process, it is verified whether or not the user who attempts to generate the driver has the authority to generate a driver. As for the verification of the authority, the input "account ID" and "password" are received from the user who attempts to generate the driver. It is determined whether or not the input "account ID" and "password" are consistent with a combination of the "user ID" and the "password" both stored in the account memory area 42c. When the input combination is consistent with the registered combination, the authority is confirmed and the user who has input the combination of the account ID and the password is permitted to generate the driver (step S02). For example, the user A inputs the account ID that is "Suzuki_k" and the password that is "1234".

In the generating process of the driver data 423, the input content from the authenticated user is received, and a new driver is generated. As for the driver data 423, entries that are the "user ID", the "protect mode", the "external instrument type ID", the "communication content", the "external instrument command", and the "data read-out format" are set (step S03). When the user A attempts to generate the driver, the "user ID" in the driver data 423 is set as "Suzuki_k". Next, the user A sets "CV-1000" as the "external instrument type", and arbitrarily sets the other entries that are "protect mode", "external instrument type ID", "communication content", "external instrument command", and "data read-out format".

In the driver registering process, the generated external driver is stored (step S04) in the driver memory area 42b in the storage 42. The external driver is stored with the index that is the "external instrument type".

(2) Point Correction Setting Process

Next, a setting is made for a point correction that is a setting of the condition to calculate the amount of correction utilized in the control data 422.

(a) Calculation of Transformation Coefficient

Figure 10:
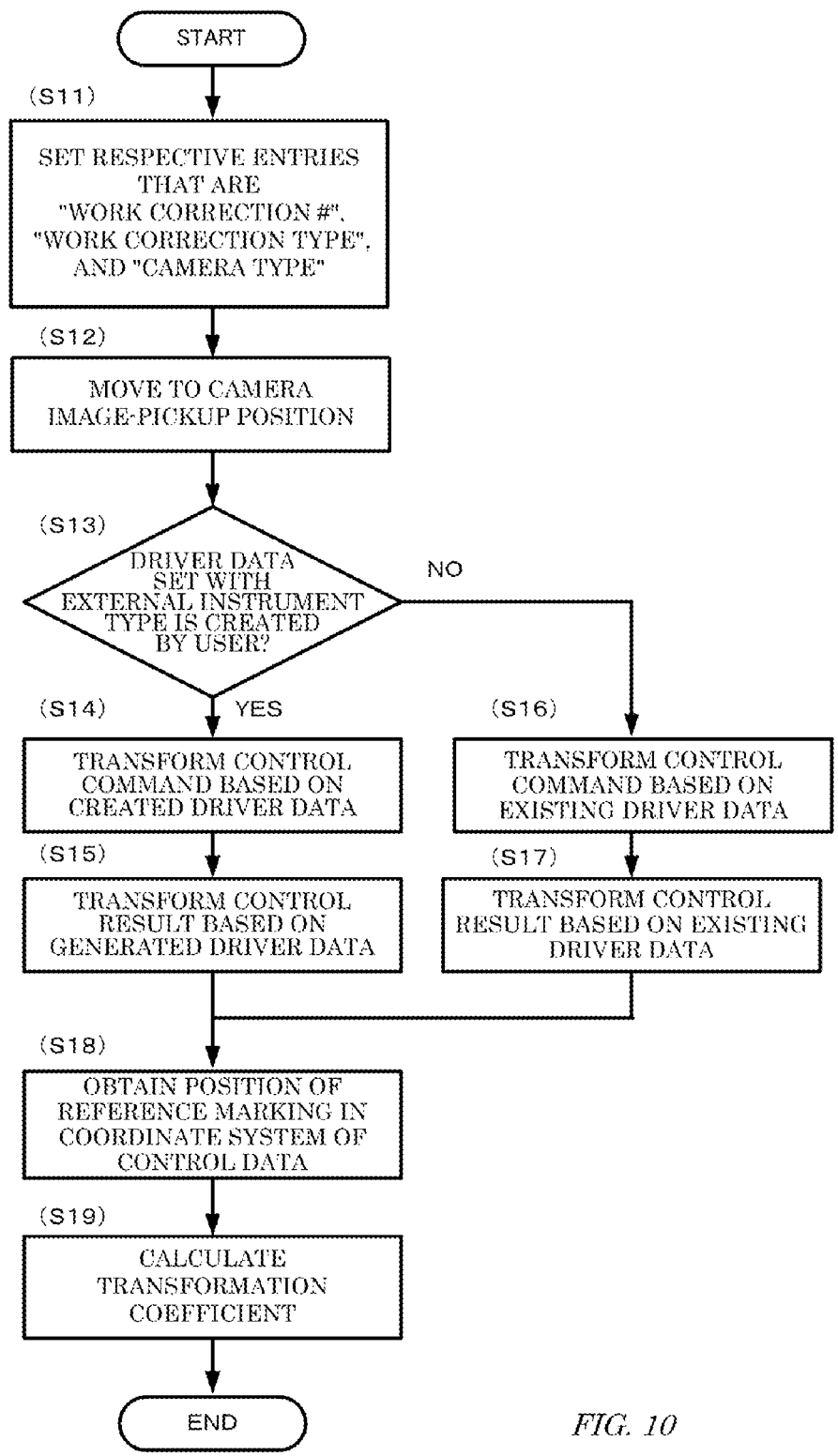
FIG. 10 is a flowchart illustrating a transformation coefficient setting process in the point correction according to the embodiment.

First, as a point correction, a setting is made for the "work correction #", the "work correction type", and the "external instrument type", and the "transformation coefficient" is calculated. The "transformation coefficient" is calculated through a so-called calibration. FIG. 10 is a flowchart illustrating a procedure of calculating the "transformation coefficient" for the point correction.

In the "transformation coefficient" calculating process, first, the "work correction #" that is the name of point correction, the "work correction type" that indicates through what kind of external instrument 2 the point correction is performed, and the "external instrument type" that indicates the type number of the external instrument 2 utilized for each work correction are set (step S11).

Next, with the work-piece W being disposed at an appropriate position and in an appropriate attitude, the moving unit 3 is controlled through the function of the robot 1, and the camera 2a is moved to a camera image-pickup position (step S12). The camera image-pickup position is a position provided above the disposing point of the work-piece W, and is indicated by the coordinate system employed by the control data 422.

After the camera 2a is moved to the camera image-pickup position, it is determined (step S13) whether or not the camera 2a set with the "external instrument type" matches the "external instrument type" given in the driver newly generated by the user. When the camera 2a matches the "external instrument type" given in the driver newly generated by the user (step S13: YES), a command for image-pickup is output (step S14) to the camera 2a in accordance with the control detail described in the driver data 423. The camera 2a outputs, to the controller 4, the coordinates of the reference marking in a picked-up image through the camera's own function. The controller 4 transforms (step S15) the image-pickup result into the format employed by the control data 422 through the external instrument driver 44.

Conversely, when the camera 2a matches the "external instrument type" stored beforehand in the driver-data memory area 42b in the controller 4 (step S13: NO), a command for image-pickup is output (step S16) to the camera 2a in accordance with the control detail described in the driver data 423. The camera 2a outputs, to the controller 4, the coordinates of the reference marking in a picked-up image through the camera's own function. The controller 4 transforms (step S17) the image-pickup result into the format employed by the control data 422 through the external instrument driver 44.

By the processes in the steps S15 and S17, the controller 4 can obtain the position of the reference marking 8 in the coordinate system of the camera 2a when the camera 2a is moved to the camera image-pickup position.

Next, the position of the reference marking in the coordinate system employed by the control data 422 is obtained. As an example method of obtaining the position of the reference marking 8 in the coordinate system employed by the control data 422, the moving unit 3 of the robot 1 is manually moved in such a way that the position of the reference marking in the visual field of the camera 2a becomes consistent with the position of the reference marking at the camera image-pickup position in the step S12 (step S18). In this case, as a method of manually moving the camera 2a, the camera 2a is not directly moved by a hand, but a method of moving the camera 2a through a manipulation to the manipulation hardware 46 is adopted. Accordingly, the position of the reference marking in the coordinate system employed by the control data 422 can be obtained.

Subsequently, a variable utilized for the calibration is calculated. In this calculation process, a variable that makes the coordinate of the reference marking picked up in the step S12 consistent with the position of the reference marking obtained by moving the arm of the robot 1 is calculated, and the calculated value is registered (step S19) in the point correction.

The "work correction #", the "work correction type", the "external instrument type", and the "transformation coefficient" set as explained above are stored in the storage 42 in association with the "external instrument type". The "external instrument type" becomes an identifier that indicates the point correction.

(b) Registration of Reference Marking Position

Figure 11:
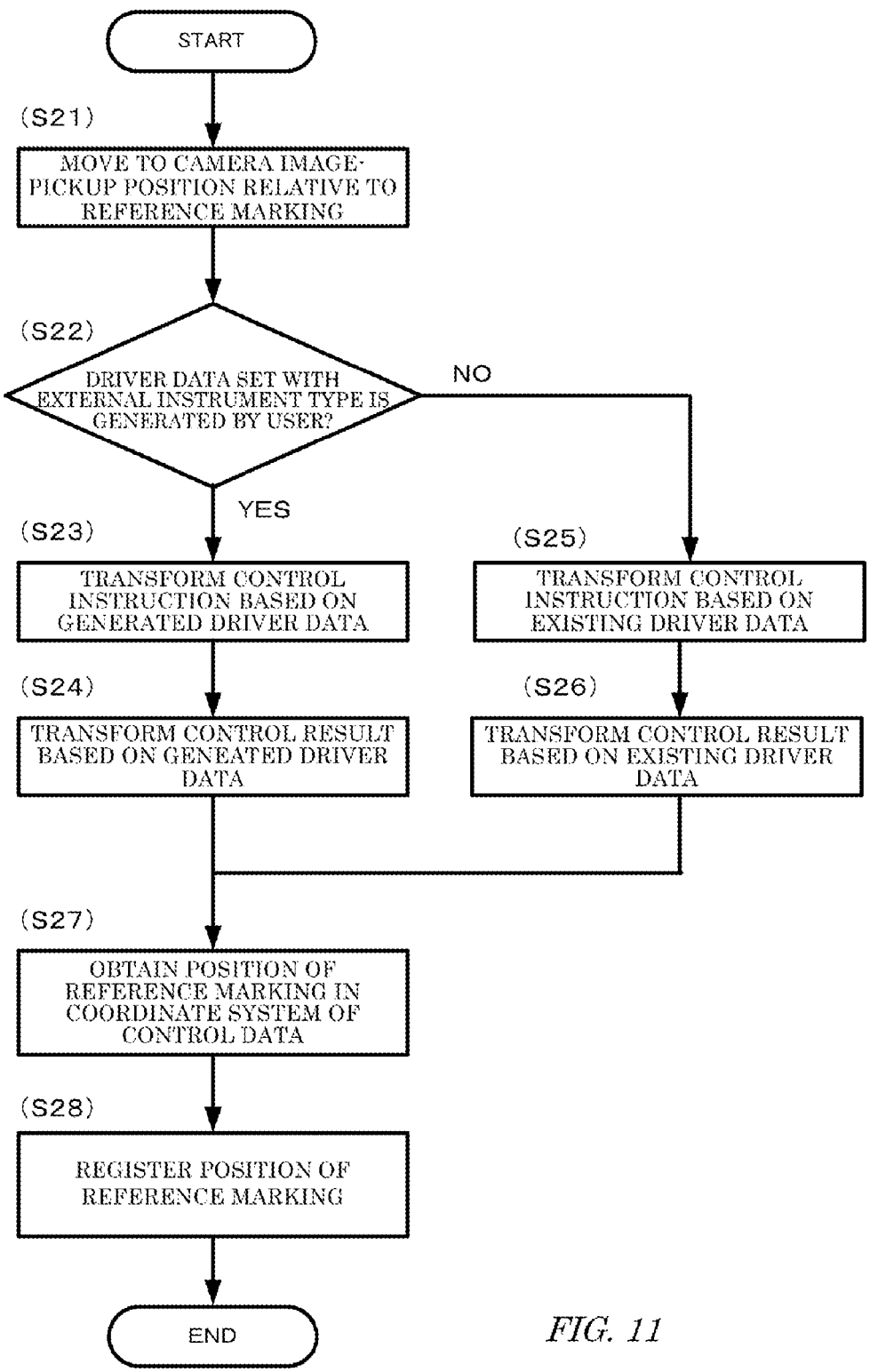
FIG. 11 is a flowchart illustrating a reference marking position setting process in the point correction according to the embodiment.

Next, the point correction that is the "reference marking position" is calculated. FIG. 11 is a flowchart illustrating a procedure of the reference marking registering process. As for the calculation of the position of the reference marking, first, the work-piece W is disposed at an appropriate position and in an appropriate attitude. Next, the controller 4 controls the moving unit 3 to move the camera 2a that is the external instrument 2 to the camera image-pickup position relative to the reference marking (step S21). The camera image-pickup position relative to the reference marking is a position provided above the disposing point of the work-piece W, and is indicated by the coordinate system employed by the control data 422.

After the camera 2a is moved to the camera image-pickup position relative to the reference marking, it is determined (step S22) whether or not the camera 2a set with the "external instrument type" matches the "external instrument type" given in the driver newly generated by the user. When the camera 2a matches the "external instrument type" given in the driver newly generated by the user (step S22: YES), a command for image-pickup is output (step S23) to the camera 2a in accordance with the control detail described in the driver data 423. The camera 2a outputs, to the controller 4, the coordinates of the reference marking in a picked-up image through the camera's own function. The controller 4 transforms (step S24) the image-pickup result into the format employed by the control data 422 through the external instrument driver 44.

Conversely, when the camera 2a matches the "external instrument type" stored beforehand in the driver-data memory area 42b in the controller 4 (step S22: NO), a command for image-pickup is output (step S25) to the camera 2a in accordance with the control detail described in the driver data 423. The camera 2a outputs, to the controller 4, the coordinates of the reference marking in a picked-up image through the camera's own function. The controller 4 transforms (step S26) the image-pickup result into the format employed by the control data 422 through the external instrument driver 44.

By the processes in the steps S24 and S26, the controller 4 can obtain the position of the reference marking 8 in the coordinate system of the camera 2a when the camera 2a is moved to the camera image-pickup position relative to the reference marking.

Next, the position of the reference marking in the coordinate system employed by the control data 422 is obtained. As an example method of obtaining the position of the reference marking 8 in the coordinate system employed by the control data 422, the transformation coefficient is adopted to the coordinate of the reference marking represented by the coordinate system employed by the camera 2a, thereby transforming it into the coordinate in the coordinate system employed by the control data 422 (step S27).

Subsequently, the coordinate of the reference marking in the coordinate system of the control data 422 is registered (step S28) as the "reference marking position" in the point correction.

(3) Control Data Generating Process

When the control data 422 is to be generated, first, a setting is made for the point correction, and then a setting is made for the "main work" at each process point, the "coordinate" of each process point, and a work after the completion of the work at the work point. In this case, in order to facilitate understanding for the present invention, an explanation will be given of an example case in which the amount of correction based on the amount of displacement of the work-piece W disposed at the disposing position in a first process point is calculated, and an application work is performed on the work-piece W at a second process point in the coordinate that reflects the amount of correction calculated at the first process point. FIG. 12 is a diagram illustrating example control data 422 of this embodiment.

As illustrated in FIG. 12, for the first process point, a setting is made for the point statement 7 which contains the point number 71 that is "#1", the point type option 72 that is "PTP drive", the point coordinate 73 that is "X=100, Y=100, and Z=20", the point speed 74 that is "speed 40", the work type option 75 that is "work after movement", the work number 76 that is "1", and the point correction 77 "none". The set work number 76 that is "1" is an identifier given to a command which is takeCamera1. The command takeCamera1 is to cause the camera 2a and the controller 4 to execute the following operations:

(a) the controller 4 outputs an image-pickup command to the camera 2a to cause the camera 2a to pick up an image;

(b) the camera 2a extracts the reference marking coordinate from a picked-up image, and outputs an extraction result to the controller 4; and (c) the controller 4 compares the reference marking coordinate output by the camera 2a with the preset reference marking coordinate, calculates the amount of correction based on the difference, and stores the calculated amount of correction in the command memory area 42d as the amount of correction for the work correction 1.

In addition, for the second process point, a setting is made for the point statement 7 which contains the point number 71 that is "#2", the point type option 72 that is "dot application", the point coordinate 73 that is "X=100, Y=140, and Z=30", the point speed 74 that is "speed 40", the work type option 75 that is "none", the work number 76 that is "none", and the point correction 77 that is "work correction 1".

Likewise, for a third process point, a setting is made for the point statement 7 which contains the point number 71 that is "#3", the point type option 72 that is "PTP drive", the point coordinate 73 that is "X=150, Y=100, and Z=20", the point speed 74 that is "speed 40", the work type option 75 that is "work after movement", the work number 76 that is "1", and the point correction 77 that is "none". In addition, for a fourth process point, a setting is made for the point statement 7 which contains the point number 71 that is "#4", the point type option 72 that is "dot application", the point coordinate 73 that is "X=150, Y=140, and Z=30", the point speed 74 that is "speed 40", the work type option 75 that is "none", the work number 76 that is "none", and the point correction 77 that is "work correction 1".

(4) Controlling Process for Moving Unit and External Instrument

In the controlling process for the moving unit 3 and the external instrument 2 which utilizes such work data, the robot 1 is operated in accordance with the control data 422 illustrated in FIG. 12. The robot 1 operates as follows.

First, the rotor 1 performs a PTP movement on the camera 2a that is the external instrument 2 to the coordinates which are set as the point coordinate 73 of the point number 71 that is "#1", and which are X=100.00, Y=100.00, Z=20.000, and R=0.0.

After the movement, the controller 4 outputs the image-pickup command to the camera 2a. This image-pickup command is transformed into the image-pickup command for the camera 2a through the external instrument driver 44. The camera 2a that has received the image-pickup command picks up an image, and extracts the coordinate of the reference marking from the picked-up image. The camera 2a outputs, to the controller 4, a control result that is the coordinate of the picked-up reference marking. In this case, the coordinate of the reference marking output by the camera 2a is the coordinate represented by the coordinate system employed by the camera 2a.

The coordinate of the reference marking output by the camera 2a is transformed into the coordinate format employed by the control data 422 for the controller 4 by the external instrument driver 44 in the controller 4. The controller 4 calculates the amount of correction based on the difference between the received coordinate of the reference marking and the registered coordinate of the reference marking in the point correction 77. This amount of correction is recorded in the point correction 77 as the correction amount 1.

Next, the controller 4 moves the applicator 2b that is another external instrument 2 to the coordinates that are X=100.00, Y=100.00, Z=20.000, and R=0.0 which are set as the coordinates of the point 2, and causes the applicator 2b to perform an applying work.

In the applying work at the point 2, when the work correction number that is the point correction is set, the applying work is performed at the coordinate obtained by reflecting, on the coordinate set as the coordinate of the point 2, the amount of correction calculated based on the condition specified in the point correction. Hence, even if the position of the work-piece W subjected to the applying work is displaced from the reference position, the applying work can be performed at an appropriate position.

[1-3. Effect]

According to the above robot 1, even if the external instrument 2 that is an unexpected type is utilized, the robot 1 can execute a work through this external instrument 2 by enabling the user to generate the driver compatible with this external instrument 2.

That is, according to conventional technologies, it is necessary to store beforehand the driver compatible with such an external instrument 2 in the storage 42. However, the kinds of external instruments 2 are significant, and it is difficult to prepare beforehand drivers compatible with all kinds of external instruments 2. In contrast, according to the robot 1 of this embodiment, the user can generate the driver compatible with the external instrument 2 to be attached, and the generated driver is added to the control data 422. Hence, the robot 1 can be compatible with various external instruments 2.

In addition, according to this embodiment, the identifier to identify the driver data 423 is given to this data. Hence, a load for the user when the work detail is associated with the driver data 423 can be reduced. FIG. 13 illustrates an example display form by the manipulation hardware 46 when the user selects the driver data 423. As illustrated in FIG. 13, when the external instrument type is selected, the user can select the kind among the selectable candidates.

Still further, the following modified examples can be adopted for this embodiment.

(1) In the embodiment, the identifier that is takeCamera1 is specified as the work number of the point statement 7 with the point number 1. When this command that is takeCamera1 is executed, the image-pickup command output by the controller 4 is transformed into and output as the external driver that reflects the driver data 423 specified by the work correction 1 of the point statement 7 with the point number 2. That is, the driver when the point statement 7 with the point number 1 is executed is specified by the point statement 7 with the point number 2. In the embodiment, however, as illustrated in FIG. 14, the external instrument type 78 utilized for each point statement 7 can be specified. According to this structure, even if plural cameras are disposed as the external instruments 2, and the individual cameras are utilized one by one, it becomes possible for the robot 1 to reflect the driver data 423 compatible with the camera to be controlled on the external driver.

Figure 15:
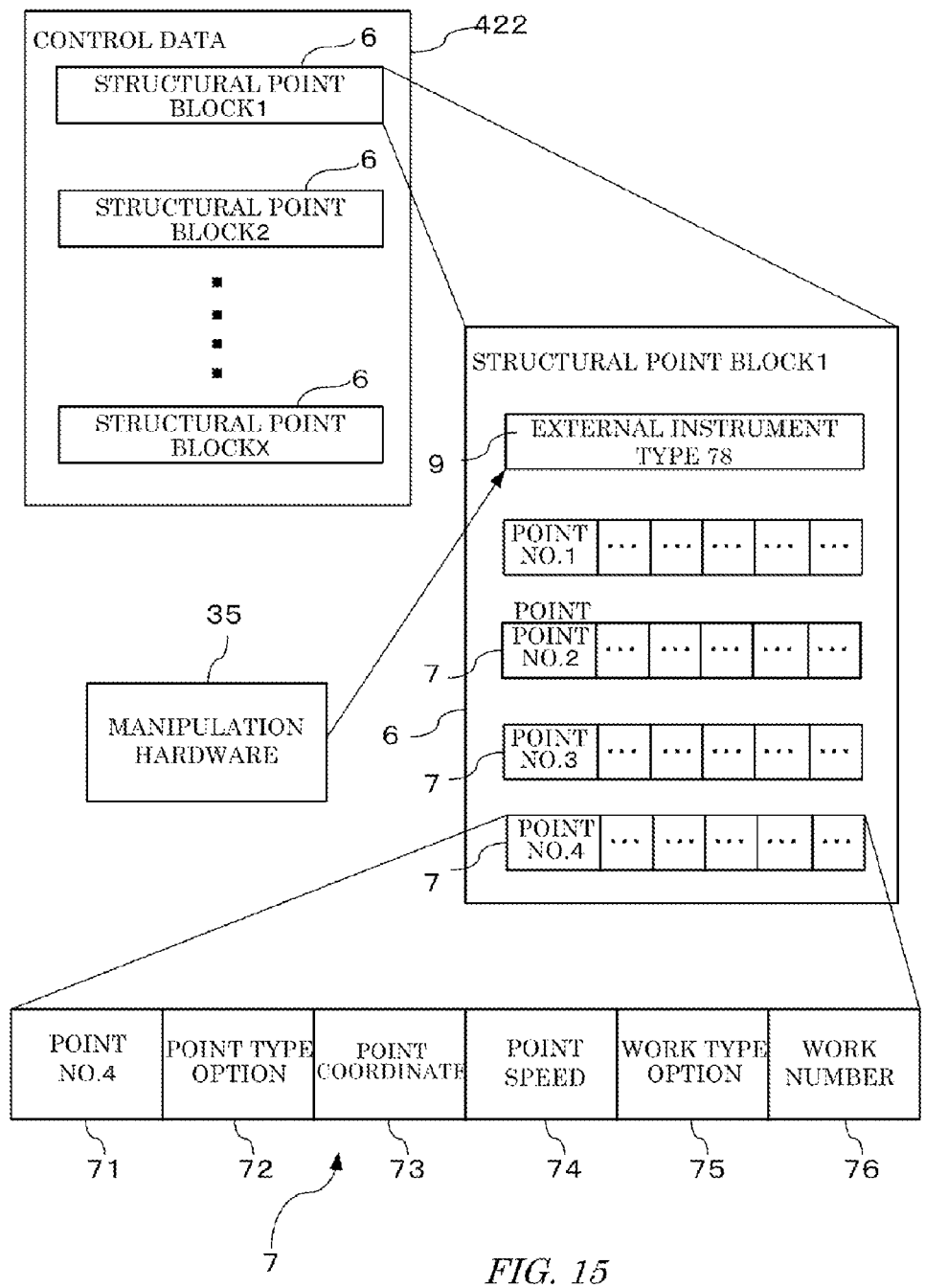
FIG. 15 is a diagram illustrating a second modified example of the control data according to the embodiment.

(2) In the embodiment, the driver data 423 to be utilized is associated in accordance with the described content of the point statement 7, but the way of association of the driver data 423 is not limited to this case. For example, as illustrated in FIG. 15, the driver data 423 to be utilized may be associated with the described content of the structural point block 6. In this case, the driver data 423 to be associated is specified for each structural point block 6 in accordance with an input through the manipulation hardware 46. As for the way of specifying the driver data 423, a table 9 is provided in the structural point block 6, and the external instrument type 78 is specified in this table 9. This makes it possible for the robot 1 to set the common external instrument type 78 to the individual structural point blocks 6. In general, it is a rare case in which the external instrument 2 is changed during the execution of the sequential works. Hence, setting of the external instrument type 78 for each work at a point is a time-consuming manipulation for the user. In contrast, the robot 1 can collectively set the external instrument type 78 to be utilized for the structural point blocks 6, and thus the effort of the user for the time-consuming manipulation can be reduced.

Figure 16:
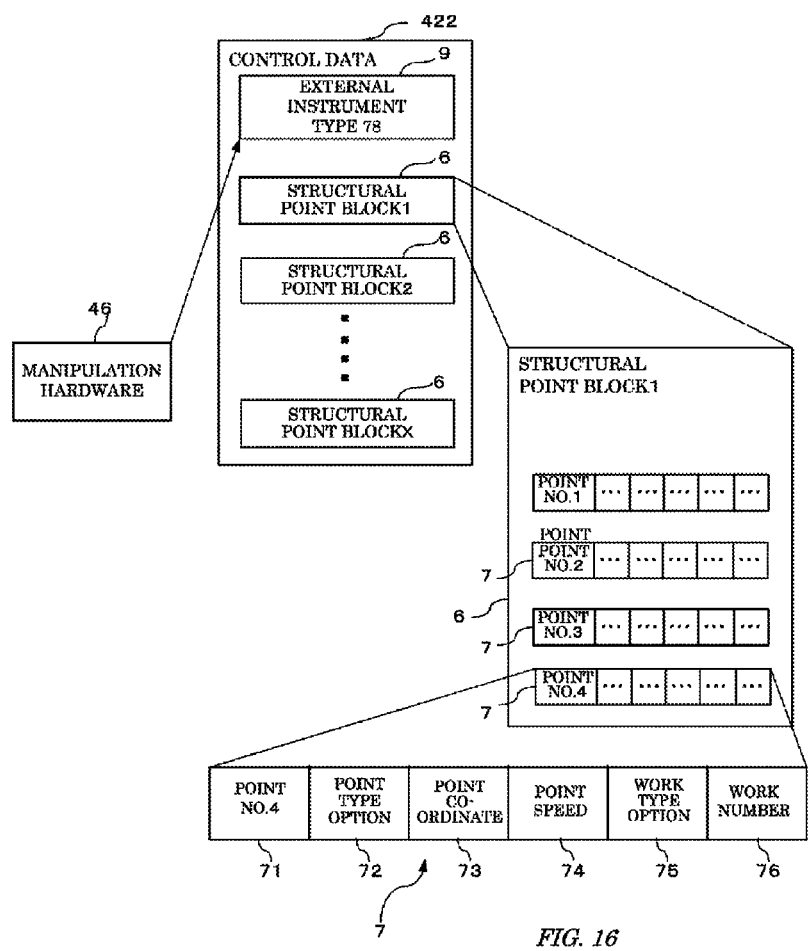
FIG. 16 is a diagram illustrating a third modified example of the control data according to the embodiment.

(3) The driver data 423 may be not associated with the structural point block 6 but may be associated with the control data 422. For example, as illustrated in FIG. 16, the table 9 may be provided in the control data 422, and the driver data 423 common to the contents of control data 423 may be specified. This makes it possible for the robot 1 to collectively set the driver data 423 to be utilized when all structural point blocks 6 in the control data 422 are executed. When the robot 1 causes a kind of external instrument 2 to execute a single work, the kind of the external driver utilized for a communication between the controller 4 and the external instrument 2 can be a single kind. In this case, when the driver is added to the structural point block 6 and is added to the work number at a point, the number of driver setting to be made increases. In this case, the driver is added to the work data.

2. Other Embodiment

The embodiment of the present invention was explained above, but various omissions, replacements, and modifications can be made without departing from the scope of the present invention. In addition, such embodiments and modified forms thereof should be within the scope of the present invention, and also within the scope of the invention as recited in appended claims and the equivalent range thereto.

(1) For example, in the embodiment, the external instrument 2 that is the camera 2a is utilized, and the amount of correction is calculated based on the amount of displacement of the work-piece W in view of an image-pickup result. In addition to this case, the external instrument 2 that is a laser sensor can be also utilized. By utilizing the laser sensor, the height of the work-piece W can be measured, and the correction in the height direction is enabled based on the measured height.

(2) In the embodiment, the amount of correction for the work-piece W disposed at the work-piece disposing position is calculated, and the control is performed based on the amount of correction. In addition to this case, by setting, in the control data 422, the control details to the external instrument 2 and to the moving unit 3, the respective coordinates of plural work-pieces W disposed at random may be calculated, and respective works can be executed based on the respective calculated coordinates.

(3) In the embodiment, one work number 76 is set in one point statement 7, but plural work numbers may be specified. When a first work number and a second work number are specified for one point statement 7, two kinds of works can be executed at the same point coordinate.

(4) In the embodiment, the protect level of the driver generated by the user is set, but the authority level may be given in accordance with the user. That is, the authority to be given to the user is distinguished step by step in accordance with the characteristic of the user. Next, the user who has a great authority may be permitted to view, edit, and delete the driver data 423 without being restricted by the protect level set by the user who has a little authority. For example, the highest protect level "A" may be given to a manufacturer who manufactures the robot 1, a second highest protect level "B" may be given to a vendor who purchases the robot 1 from the manufacturer and sets up the robot 1, and a third highest protect level "C" may be given to a purchaser who purchases the robot 1 from the vendor and sets up the robot 1 through the vendor. According to this structure, when the user requests the manufacturer to repair or maintenance the robot 1, an engineer sent from the manufacturer can edit the driver data 423 that has been set by the user.

What is claimed is:

1. A robot executing sequential works at each work point, the robot comprising:
    an external instrument executing a main work at the each work point in the sequential works;
    a controller outputting a control instruction to the external instrument based on control data including structural point blocks arranged in sequence, the structural point blocks bundling the sequential works at the each work point;
    an external instrument driver transforming a format of data exchanged between the external instrument and the controller;
    a driver generator generating driver data indicating, in advance, a command corresponding to the control instruction, an external instrument type indicating a type of the external instrument and an operation detail transmitting the command to the external instrument;
    a memory storing, in advance, the driver data generated by the driver generator;
    a driver selector selecting the driver data from the memory utilized for the external instrument driver in accordance with the external instrument to be utilized and writing the external instrument driver based on the selected driver data;
    a transformation coefficient calculator calculating a transformation coefficient to transform a coordinate system employed by the external instrument indicated by the external instrument type into a coordinate system employed by the control data; and
    the external instrument driver written by the driver selector based on the driver data generated by the driver generator and outputting, in response to the control instruction, the command included in the driver data the driver selector selected in accordance with the operation detail included in the driver data selected by the driver selector and transforming the coordinate system employed by the external instrument indicated by the external instrument type into the coordinate system employed by the control data with the transformation coefficient calculated by the transformation coefficient calculator.

2. The robot according to claim 1, wherein:
    the sequential works includes the main work executed by the external instrument, a pre-work and a post-work before and after the main work, and positioning to a plurality of work points for the main work; and the structural point block constructing the control data stores data indicating a work in the sequential works and a detail of movement, and the driver data in association with each other.

3. The robot according to claim 1, wherein:
the structural point block contains point statements indicating all work points to be positioned during the sequential works, and details of the works before the movement to the point, during the movement, and after the movement, the point statements being arranged in sequence in the structural point block; and
the each point statement stores, in association with each other, data indicating a work in the sequential works and a detail of the movement, and, the driver data.

4. The robot according to claim 1, further comprising an external-instrument driver storage storing the driver data with an identifier to identify the stored driver data, wherein in the control data, the driver data to be utilized is specified by the identifier.

5. The robot according to claim 1, wherein the driver data contains an order of execution of the works to be executed by the external instrument, and, a work command that causes the external instrument to execute the work.

6. The robot according to claim 1, wherein the driver data contains a variable utilized when data transmitted from the external instrument is received by the controller.

7. The robot according to claim 1, further comprising a user verifier verifying an account given to a user, wherein the driver generator generates the driver data in accordance with an input given by the user who has the account.

8. The robot according to claim 7, wherein
there are plural kinds of the account; and
an authority with a different level account by account is given.

9. The robot according to claim 1, wherein the external instrument is a sensor or a camera.

10. A robot executing sequential works at each work point, the robot comprising:
an external instrument executing a main work at the each work point in the sequential works;
a controller outputting a control instruction to the external instrument based on control data including structural point blocks arranged in sequence, the structural point blocks bundling the sequential works at the each work point;
an external instrument driver transforming a format of data exchanged between the external instrument and the controller;
a driver generator generating driver data indicating, in advance, a command corresponding to the control instruction, an external instrument type indicating a type of the external instrument and an operation detail transmitting the command to the external instrument;
a memory storing, in advance, the driver data generated by the driver generator;
a driver selector selecting the driver data from the memory utilized for the external instrument driver in accordance with the external instrument to be utilized and writing the external instrument driver based on the selected driver data;
a transformation coefficient calculator calculating a transformation coefficient to transform a coordinate system employed by the external instrument indicated by the external instrument type into a coordinate system employed by the control data; and
the external instrument driver written by the driver selector based on the driver data generated by the driver generator and outputting, in response to the control instruction, the command included in the driver data the driver selector selected in accordance with the operation detail included in the driver data selected by the driver selector and transforming the coordinate system employed by the external instrument indicated by the external instrument type into the coordinate system employed by the control data with the transformation coefficient calculated by the transformation coefficient calculator, wherein:
the control data contains a position of the work point, and a point correction that is a condition to calculate an amount of correction in accordance with an amount of displacement from a disposing position of a work-piece subjected to the work; and wherein
the point correction contains a coordinate of a reference marking given to the work-piece and becoming a reference when the work-piece is disposed at an appropriate disposing position, the external instrument type, and the transformation coefficient.

11. The robot according to claim 10, wherein:
the sequential works includes the main work executed by the external instrument, a pre-work and a post-work before and after the main work, and positioning to a plurality of work points for the main work; and
the structural point block constructing the control data stores data indicating a work in the sequential works and a detail of movement, and the driver data in association with each other.

12. The robot according to claim 10, wherein:
the structural point block contains point statements indicating all work points to be positioned during the sequential works, and details of the works before the movement to the point, during the movement, and after the movement, the point statements being arranged in sequence in the structural point block; and
the each point statement stores, in association with each other, data indicating a work in the sequential works and a detail of the movement, and, the driver data.

13. The robot according to claim 10, further comprising an external-instrument driver storage storing the driver data with an identifier to identify the stored driver data, wherein in the control data, the driver data to be utilized is specified by the identifier.

14. The robot according to claim 10, wherein the driver data contains an order of execution of the works to be executed by the external instrument, and, a work command that causes the external instrument to execute the work.

15. The robot according to claim 10, wherein the driver data contains a variable utilized when data transmitted from the external instrument is received by the controller.

16. The robot according to claim 10, further comprising a user verifier verifying an account given to a user, wherein the driver generator generates the driver data in accordance with an input given by the user who has the account.

17. The robot according to claim 16, wherein
there are plural kinds of the account; and
an authority with a different level account by account is given.

18. The robot according to claim 10, wherein the external instrument is a sensor or a camera.

* * * * *